Patented Dec. 27, 1932

1,892,310

UNITED STATES PATENT OFFICE

GEORG KRAENZLEIN AND ROBERT WELDE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

DERIVATIVES OF NAPHTHAZARINE AND PROCESS OF PREPARING THEM

No Drawing. Application filed July 17, 1929, Serial No. 379,065, and in Germany August 4, 1928.

The present invention relates to new derivatives of naphthazarine and to a process of preparing them.

As is known easily decomposable naphthazarine intermediate products are obtainable by treating an alpha-dinitronaphthalene, such as 1.8- or 1.5-dinitronaphthalene with sulfuric acid in the presence of a reducing agent as, for instance, aniline, beta-naphthylamine, phenylhydrazine, a metal as, for instance, zinc or iron, sulfur, hydrogen sulfide, or the like (cf. for instance German Patents Nos. 76.922, 108.551, British Patents Nos. 3828/1894 and 890/1900, or U. S. Patent No. 667,486).

We have now found that the said naphthazarine intermediate products, which are, for instance, obtainable in the form of an aqueous solution according to the processes of the above-named patents, can be converted into new condensation products by causing an aliphatic aldehyde as, for instance, formaldehyde, acetaldehyde, or the like, to react with the said intermediate products. The thus formed condensation products are insoluble in water and sparingly soluble in organic solvents. They may be used as dyestuffs or as intermediate products for further transformations. They are valuable for use as dye-pigments for oil-painting, as nitrocellulose lacquers and as spray-dyestuffs for book-printing and lithography in the wallpaper and stained paper industries.

The following example serves to illustrate our invention but it is not intended to limit it thereto.

(1) 300 ccm of a solution of formaldehyde are added to 10 liters of a solution of the naphthazarine-intermediate product (corresponding to 2 kg. of a naphthazarine melt) of the following probable formula:

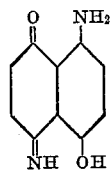

which product is obtainable from 1.5-dinitronaphthalene by the process disclosed in the above mentioned patents. The condensation product separates while the at first deep blue solution is discolorized. The condensation product is filtered by suction and washed with water until neutral. It forms a black amorphous powder, is insoluble in water, forms a very sparingly soluble sodium salt, is very sparingly soluble in most of the generally used organic solvents and dissolves in concentrated sulfuric acid to a Bordeaux-red solution. On pouring the sulfuric acid solution into water the product separates in the form of a black precipitate without being changed. The intermediate product obtainable from 1.8-dinitronaphthalene can be condensed in an analogous manner.

By substituting in the foregoing example acetaldehyde or aldole for the formaldehyde and otherwise proceeding in the same manner corresponding condensation products of similar properties are obtained. The products thus obtained are distinguished by their excellent fastness to light being for the most part better than that of the hitherto used black aniline-oxidation-dyestuffs.

We claim:

1. The process which comprises causing a naphthazarine intermediate product obtainable by treating a compound of the group consisting of 1.5- and 1.8-dinitro-naphthalene with sulfuric acid in the presence of a reducing agent according to known processes to react with an aliphatic aldehyde.

2. The process which comprises causing a naphthazarine intermediate product obtainable by treating a compound of the group consisting of 1.5- and 1.8-dinitro-naphthalene with sulfuric acid in the presence of a reducing agent according to known processes to react with an aliphatic aldehyde in an aqueous medium.

3. The process which comprises causing the naphthazarine intermediate product derived from 1.5-dinitronaphthalene and having the probable formula:

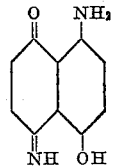

to react with an aliphatic aldehyde in an aqueous medium.

4. The process which comprises causing the naphthazarine intermediate product derived from 1.5-dinitronaphthalene and having the probable formula:

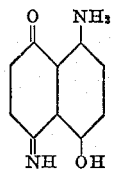

to react with formaldehyde in an aqueous medium.

5. As new compounds the condensation products which are obtainable by causing an aliphatic aldehyde to react with a naphthazarine intermediate product obtainable by treating a compound of the group consisting of 1.5- and 1.8-dinitro-naphthalene with sulfuric acid in the presence of a reducing agent according to known processes, the said new condensation products being insoluble in water and sparingly soluble in most of the organic solvents.

6. As new compounds the condensation products which are obtainable by causing an aliphatic aldehyde to react with the naphthazarine intermediate product derived from 1.5-dinitronaphthalene and having the probable formula:

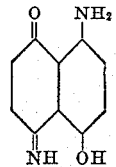

the said new condensation products being insoluble in water and sparingly soluble in most of the organic solvents.

7. As a new compound the black amorphous powder being insoluble in water, sparingly soluble in organic solvents, dissolving in concentrated sulfuric acid to a Bordeaux-red solution, and forming a sparingly soluble sodium salt which product is obtainable by causing formaldehyde to react with the napthtazarine intermediate product derived from 1.5-dinitronaphthalene and having the probable formula:

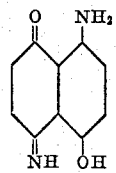

In testimony whereof, we affix our signatures.

GEORG KRAENZLEIN.
ROBERT WELDE.